United States Patent [19]

Welch

[11] Patent Number: 4,688,333

[45] Date of Patent: Aug. 25, 1987

[54] SELF-INKING STAMP ALIGNMENT TOOL

[76] Inventor: Aaron P. Welch, 541 N. Reynolds Rd., Toledo, Ohio 43615

[21] Appl. No.: 898,102

[22] Filed: Aug. 20, 1986

[51] Int. Cl.$^4$ .................................... G01B 5/00

[52] U.S. Cl. .................................... 33/614; 33/1 AA; 33/430

[58] Field of Search ............... 33/180 R, 184.5, 184.6, 33/430, 1 AA; 100/400, DIG. 12

[56] References Cited

U.S. PATENT DOCUMENTS

| | | | |
|---|---|---|---|
| 564,066 | 7/1896 | Fowler | 33/184.6 |
| 880,883 | 3/1908 | Harton | 33/184.6 |
| 902,584 | 11/1908 | Huebner | 33/184.5 X |
| 4,503,618 | 3/1985 | Eberhardt | 33/184.5 X |

FOREIGN PATENT DOCUMENTS

| | | | |
|---|---|---|---|
| 19756 | of 1913 | United Kingdom | 33/184.5 |

*Primary Examiner*—Harry N. Haroian

*Attorney, Agent, or Firm*—Emch, Schaffer, Schaub & Porcello Co.

[57] ABSTRACT

An alignment structure provides means to locate a self-inking stamp in a plurality of positions over articles, which vary in size, to make repeated impressions for quantities of the same article, at a desired location. An adjustable nesting bar holds the self-inking stamp in an elevated position across a stationary and an adjustable gauge bar in parallel position to one another, gauging the article on two sides. Adjustable depth gauges mounted on the gauge bars provide gauging on a third side of the article.

14 Claims, 4 Drawing Figures

SELF-INKING STAMP ALIGNMENT TOOL

SUMMARY

It is common practice for individuals and businesses to use return-address self-inking stamps on stationery, envelopes, flyers, catalogs, etc. There is a problem of accurately and quickly aligning the stamps for quantities of an article.

An objective of the present invention is the provision of gauging means by which self-inking stamps may be placed in a fixed position above an article for the purpose of stamping quantities of the given article accurately, quickly and to eliminate the eyestrain incurred from lining up the stamp over and over again when making quantities of impressions.

DESCRIPTION

The following description of the preferred form of the invention with reference to the accompanying drawings is as such:

Figure 1:
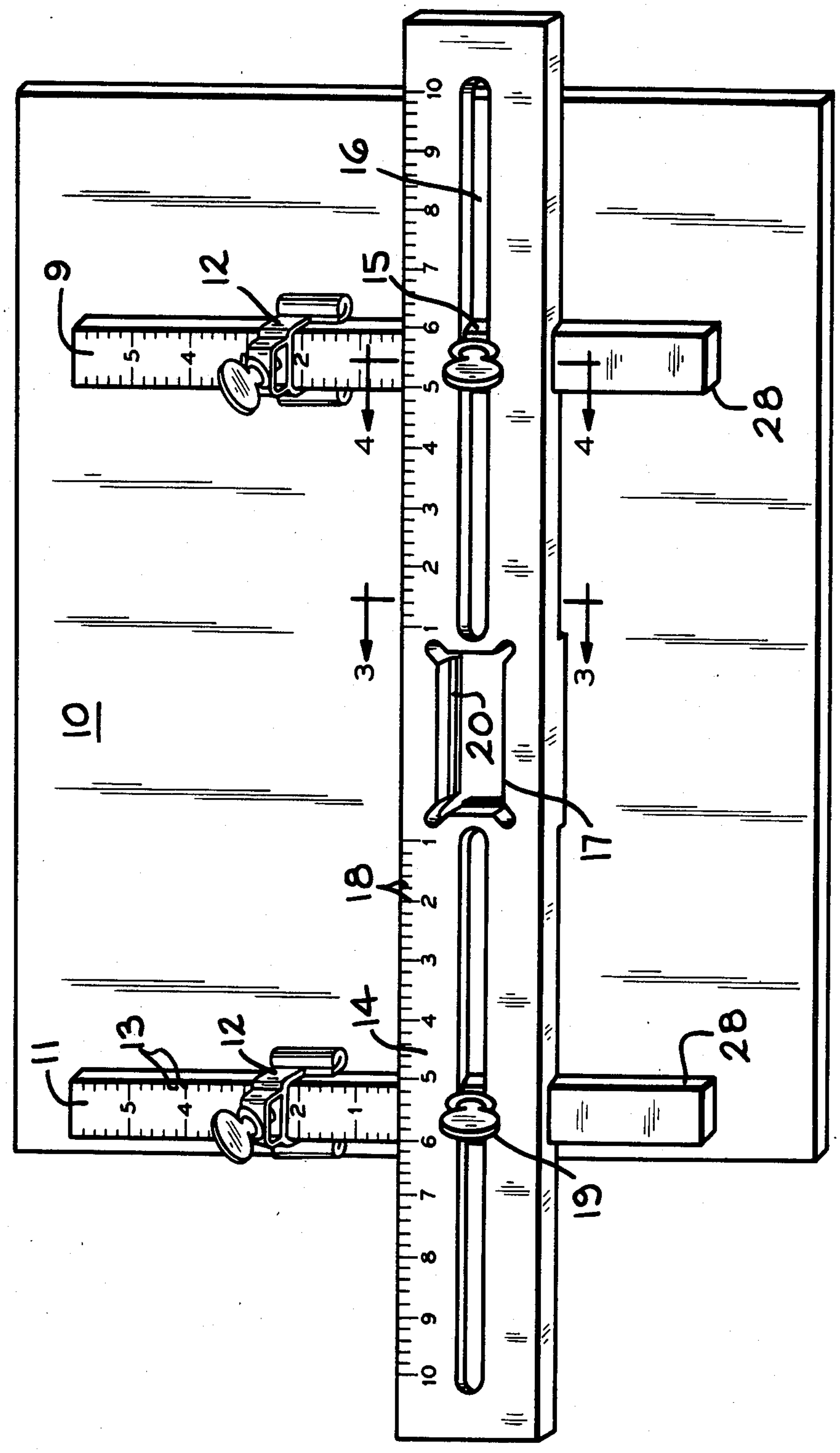
FIG. 1 is a plan view of the apparatus.
Figure 4:
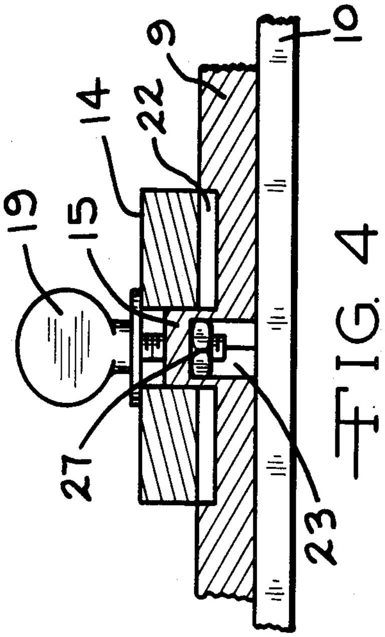
FIG. 4 is a cross section, intersection between gauge bars and nesting bar.

The apparatus in FIG. 1 comprises a base 10 providing a surface for articles to be stamped, to rest upon, as well as a means for mounting a stationary gauge bar 11 and a surface to support an adjustable gauge bar 9. The gauge bars 9 and 11 are of identical construction, differing only in mounting. Gauge bar 11 is permanently fastened to the base 10 and also fastened with adjustment means 16/19 to the nesting bar 14. Whereas gauge bar 9 is only fastened with adjustment means 16/19 to the nesting bar 14. Fastening means 19 for the nesting bar 14 to the gauge bars 9 and 11 is shown in detail in FIG. 4 where cavity 23 receives a nut 27, which in turn receives a thumb screw 19. The inside edges 28 of gauge bars 9 and 11 provide bearing surface for articles of varying widths and have an indicating means 13 for adjustment of the adjustable depth gauges 12 mounted thereupon. Gauge bars 9 and 11 have a keyed structure 15 FIG. 4 for mounting the nesting bar 14 at right angles to and on top of said gauge bars 9 and 11.

The adjustable depth gauges 12 are tightened and loosened by turning the thumb screw which draws in or pushes out the legs which straddle the gauge bars 9 and 11.

The nesting bar 14 is mounted transversely to the gauge bars 9 and 11 and receive elevation from them. The nesting bar 14 can receive additional elevation by riser shims 22 FIG. 4, when needed, to permit thicker articles to be stamped, which would increase the clearance 25 FIG. 2 between said nesting bar 14 and the base 10.

Figure 2:
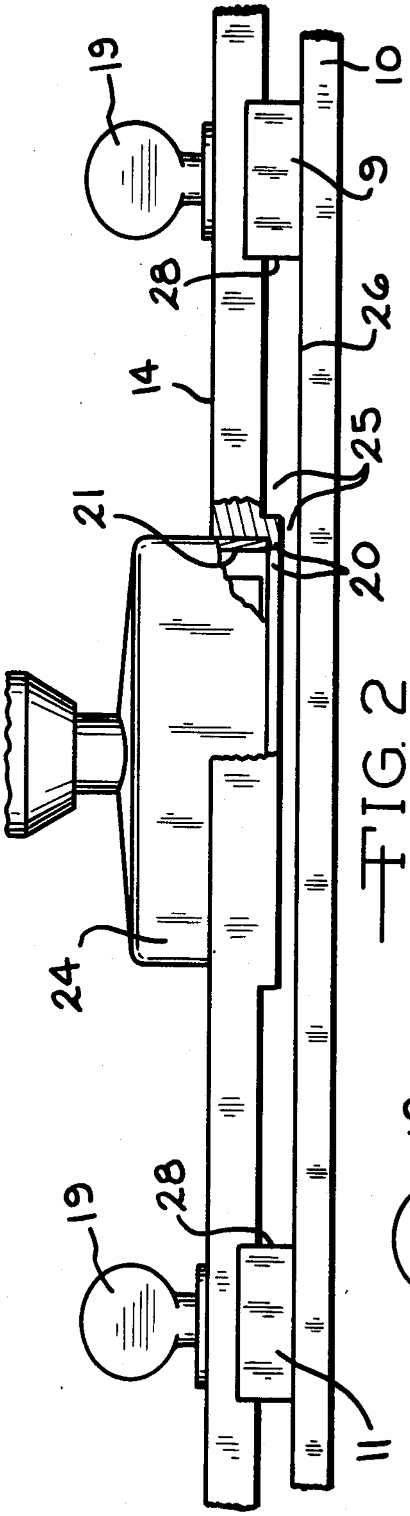
FIG. 2 is the front view, broken out sections.
Figure 3:
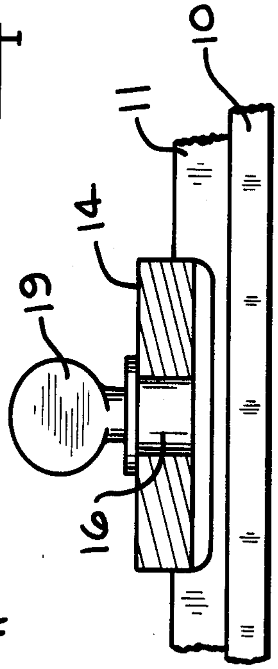
FIG. 3 is a cross section, profile of the nesting bar at the nesting location.

The elongated slots 16 in the nesting bar 14 provide transverse adjustment and the nesting location 17 provides a means to hold the self-inking stamp 24 in a fixed elevated position. The self-inking stamp 24 FIG. 2 rests upon a ledge 20 for support to maintain parallelism with the base 10 as can be seen in FIG. 2 broken out sections of the stamp 24/21, and the nesting bar 14. Thumb screws 19 are for fastening the nesting bar 14 to gauge bars 9 and 11 when a desired location has been chosen. Indicating means 18 on the nesting bar 14 is provided for transverse adjustment.

In FIG. 2 an article 26 to be stamped, represented by a heavy line, lies between the gauge bars 9 and 11 and rests upon the base 10.

HOW TO USE THE INVENTION

When a quantity of the same item is to be stamped, a sample is first made by carefully stamping one piece manually at the desired location on the article, without the alignment tool.

The opening of the adjustable nesting bar 14 is visually aligned with the impression on the sample by first moving the adjustable gauge 9 far to the right and the adjustable stop gauges 12 back out of the way.

Then the sample is placed against the stationary gauge bar 11 and the adjustable nesting bar 14 is moved across until it is aligned with the impression on the sample.

The screw 19 at this intersection is then tightened.

Next, the adjustable gauge bar 9 is moved to the left until it is approximately 1/32" from the sample item. This clearance is important for ease of loading and unloading material.

The screw 19 at this intersection is then tightened.

With the sample 26 still in place under the opening of the adjustable nesting bar 9, one of the adjustable stop gauges 12 is moved forward until it touches the edge of the sample and is tightened in place.

The other stop gauge 12 is also brought forward to the identical location on the other guide bar 9 or 11 using the graduations 13 to match with and is tightened in place.

At this point all is set and the stamp 24 is placed in the nesting location 17 ready for multiple impressions.

I claim:

1. An alignment structure for varying the position of an ink stamp crosswise and lengthwise above articles to be stamped by said ink stamp, said alignment structure allowing impressions to be stamped upon quantities of articles at a desired preselected location, said alignment structure comprising:

a base for supporting articles to be stamped;

a stationary gauge bar positioned on said base;

a nesting bar movably mounted on said stationary gauge bar, said mesting bar extending from said stationary gauge bar, said nesting bar being positioned substantially perpendicular to said stationary gauge bar;

an adjustable gauge bar movably connected to said nesting bar, said adjustable gauge bar positioned in substantially parallel relationship to said stationary gauge bar, said adjustable gauge bar being movably positioned on said base, said stationary and adjustable gauge bars elevating said nesting bar above said base;

stop means movably positioned on said stationary and adjustable gauge bars, said stop means being disposed for stopping articles to be stamped in a plurality of indicated positions;

means for positioning an ink stamp on said nesting bar, said ink stamp positioned in spaced apart, parallel relationship to said base, said ink stamp being movable towards said base to stamp an article positioned on said base; and, indicating means disposed on said nesting bar and said gauge bars to assist in positioning said ink stamp in the desired location with respect to said article to be stamped.

2. The structure of claim 1 wherein said nesting bar has a slot located on either side of said means for positioning an ink stamp, said slots extending longitudinally along said nesting bar.

3. The structure of claim 2 wherein a securement means is positioned in each of said slots, said securement means in one slot engaging said stationary gauge bar and said securement means in said other slot engaging said adjustable gauge bar, said securement means and said slots cooperating to position said means for positioning an ink stamp in the desired location with respect to said article to be stamped.

4. The structure of claim 1 wherein said stop means positioned on said stationary and adjustable gauge bars are substantially U-shaped and extend over said gauge bars, said end of said legs that extend from said base of said U-shaped stop means terminating in a section of enlarged cross section, and said section acting as a stop for said article to be stamped.

5. The structure of claim 1 wherein a bracket is position on said base of said stop means and a thumb screw extends through said bracket in a direction towards said base of said stop means, said thumb screw engaging said base and causing said legs of said stop means to engage said gauge bars to secure said stop means in the desired position on said gauge bars.

6. The structure of claim 1 wherein said means for positioning said ink stamp is an opening located in said nesting bar, a ledge being positioned around at least a portion of said opening for supporting said case for said ink stamp so that said stamping portion of said ink stamp can be advanced towards said article to stamp an impression upon said article in the desired location.

7. The structure of claim 1 wherein said nesting bar is positioned on the surface of said gauge bars that is spaced apart from said base and said nesting bar is spaced apart from said base.

8. The structure of claim 7 wherein said nesting bar is moveably positioned in notches formed in said gauge bars, said notches locating said nesting bar with respect to said gauge bars.

9. The structure of claim 8 wherein shims can be positioned in said notches to space said nesting bar further from said base to accomodate thicker articles to be imprinted.

10. An alignment structure for varying the position of an ink stamp crosswise and lengthwise above articles to be stamped by said ink stamp, said alignment structure allowing impressions to be stamped upon quantities of articles at a desired preselected location, said alignment structure comprising:

a base for supporting articles to be stamped;

a stationary gauge bar positioned on said base;

a nesting bar movably mounted on said stationary gauge bar, said mesting bar extending from said stationary gauge bar, said nesting bar being positioned substantially perpendicular to said stationary gauge bar;

an adjustable gauge bar movably connected to said nesting bar, said adjustable gauge bar positioned in substantially parallel relationship to said stationary gauge bar, said adjustable gauge bar being movably positioned on said base, said stationary and adjustable gauge bars elevating said nesting bar above said base;

stop means movably positioned on said stationary and adjustable gauge bars, said stop means being disposed for stopping articles to be stamped in a plurality of indicated positions;

means for positioning an ink stamp on said nesting bar, said ink stamp positioned in spaced apart, parallel relationship to said base, said ink stamp being movable towards said base to stamp an article positioned on said base;

indicating means disposed on said nesting bar and said gauge bars to assist in positioning said ink stamp in the desired location with respect to said article to be stamped;

a slot positioned on said nesting bar on either side of said means for positioning an ink stamp, said slots extending longitudinally along said nesting bar; and, a securement means positioned in each of said slots, said securement means in one slot engaging said stationary gauge bar and said securement means in said other slot engaging said adjustable gauge bar, said securement means and said slots cooperating to position said means for positioning an ink stamp in the desired location with respect to said article to be stamped.

11. The structure of claim 10 wherein said stop means positioned on said stationary and adjustable gauge bars are substantially U-shaped and extend over said gauge bars, said end of said legs that extend from said base of said U-shaped stop means terminating in a section of enlarged cross section, and said section acting as a stop for said article to be stamped.

12. The structure of claim 11 wherein a bracket is positioned on said base of said stop means and a thumb screw extends through said bracket in a direction towards said base of said stop means, said thumb screw engaging said base and causing said legs of said stop means to engage said gauge bars to secure said stop means in the desired position on said gauge bars.

13. The structure of claim 10 wherein said nesting bar is moveably positioned in notches formed in said stationary and adjustable gauge bars, said notches locating said nesting bar with respect to said gauge bars.

14. The structure of claim 13 wherein shims can be positioned in said notches to space said nesting bar further from said base to accomodate thicker articles to be imprinted.

* * * * *